US012073746B2

(12) United States Patent
Yernaux

(10) Patent No.: US 12,073,746 B2
(45) Date of Patent: Aug. 27, 2024

(54) VISUAL INDICATOR SUPPORT AND CORRESPONDING PAYMENT DEVICE

(71) Applicant: BANKS AND ACQUIRERS INTERNATIONAL HOLDING, Paris (FR)

(72) Inventor: Olivier Yernaux, Romans-sur-Isere (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 471 days.

(21) Appl. No.: 17/292,237

(22) PCT Filed: Oct. 22, 2019

(86) PCT No.: PCT/EP2019/078664
§ 371 (c)(1),
(2) Date: May 7, 2021

(87) PCT Pub. No.: WO2020/094382
PCT Pub. Date: May 14, 2020

(65) Prior Publication Data

US 2021/0407326 A1 Dec. 30, 2021

(30) Foreign Application Priority Data

Nov. 8, 2018 (FR) ...................................... 1860315

(51) Int. Cl.
*G09F 7/22* (2006.01)

(52) U.S. Cl.
CPC ...................................... *G09F 7/22* (2013.01)

(58) Field of Classification Search
CPC ... G09F 7/22; G09F 13/049; G09F 2007/1882
See application file for complete search history.

(56) References Cited

U.S. PATENT DOCUMENTS

| | | | | |
|---|---|---|---|---|
| 9,378,495 B1 * | 6/2016 | Poole | .................. | H04B 5/0031 |
| 9,378,496 B1 * | 6/2016 | Poole | .................. | H04B 5/0062 |
| 10,044,412 B1 * | 8/2018 | Poole | ................ | G06Q 20/3278 |
| 10,312,625 B2 * | 6/2019 | Andre | ................. | G06K 7/0056 |
| 11,042,869 B1 * | 6/2021 | Jezorek | ................. | G06Q 20/12 |

(Continued)

FOREIGN PATENT DOCUMENTS

| | | |
|---|---|---|
| CA | 2904460 A1 | 3/2016 |
| EP | 3168817 A1 | 5/2017 |

(Continued)

OTHER PUBLICATIONS

Machine translation of European Office Action dated Oct. 10, 2022 for corresponding EP Application No. 19787000.9.

(Continued)

*Primary Examiner* — Nathan A Mitchell
(74) *Attorney, Agent, or Firm* — David D. Brush; Westman, Champlin & Koehler, P.A.

(57) ABSTRACT

A visual indicator support which is intended to be irreversibly assembled on an outer face of a payment device and is configured to assume an orientation position, in which, when assembled with the payment device, it is mobile in rotation about an axis substantially perpendicular to the outer face of the payment device.

15 Claims, 9 Drawing Sheets

(56) References Cited

U.S. PATENT DOCUMENTS

| | | | | |
|---|---|---|---|---|
| 11,238,434 | B2 * | 2/2022 | Rotsaert | G07F 7/0873 |
| 11,258,198 | B1 * | 2/2022 | Nedelea | H01R 13/502 |
| 2003/0178290 | A1 | 9/2003 | Schilling | |
| 2006/0160487 | A1 * | 7/2006 | Nam | H04M 1/72409 455/41.1 |
| 2008/0236991 | A1 * | 10/2008 | Arakaki | G07F 7/0873 194/210 |
| 2010/0182764 | A1 * | 7/2010 | Phillips | H05K 9/002 361/816 |
| 2012/0168503 | A1 * | 7/2012 | Phillips | G07F 7/0893 29/428 |
| 2013/0095810 | A1 * | 4/2013 | Moreton | G06K 19/0727 705/16 |
| 2013/0264234 | A1 * | 10/2013 | Cohen | G06Q 20/3226 206/320 |
| 2014/0189821 | A1 * | 7/2014 | Ying | H04W 12/068 726/5 |
| 2016/0134065 | A1 * | 5/2016 | Gravermann | H01R 43/16 439/578 |
| 2017/0011385 | A1 * | 1/2017 | Rotsaert | G06Q 20/352 |
| 2017/0140615 | A1 | 5/2017 | Larnac et al. | |
| 2017/0148007 | A1 * | 5/2017 | Coquelet | G07F 7/0893 |
| 2017/0206447 | A1 * | 7/2017 | Sandock | H01R 13/627 |
| 2017/0269768 | A1 | 9/2017 | Shin et al. | |
| 2019/0392416 | A1 * | 12/2019 | Bernholc | G06Q 20/401 |
| 2020/0342433 | A1 * | 10/2020 | Yasutomi | G07F 7/0893 |
| 2022/0051227 | A1 * | 2/2022 | Abdul-Rasul | G06Q 20/3278 |

FOREIGN PATENT DOCUMENTS

| | | | |
|---|---|---|---|
| FR | 3063561 | A1 | 9/2018 |
| KR | 101873350 | B1 | 7/2018 |
| WO | 2011013074 | A1 | 2/2011 |
| WO | 2018167016 | A1 | 9/2018 |

OTHER PUBLICATIONS

International Search Report dated Jan. 7, 2020 for corresponding International Application No. PCT/ EP2019/078664, Oct. 22, 2019.

Written Opinion of the International Searching Authority dated Jan. 7, 2020 for corresponding International Application No. PCT/ EP2019/078664, filed Oct. 22, 2019.

Block. “Lockable Payment Terminal Stands” Dec. 31, 2015 (Dec. 31, 2015), Retrieved from the Internet: http://www.blockandcompany.com/media/wysiwyg/pdf/EMV-Lockable-Paymet-Terminal-Stand.pdf [retrieved on Jul. 24, 2019], XP055608454.

Rayer Kiyo. “Razer Kiyo Master Guide”, Jun. 13, 2018 (Jun. 13, 2018), Retrieved from the Internet: https://images-eu.ssl-images-amazon.com/images/1/81PdDoHBj4S.pdf [retrieved on Jul. 24, 2019], XP055608442.

English translation of the Written Opinion of the International Searching Authority dated Jan. 17, 2020 for corresponding International Application No. PCT/EP2019/078664, filed Oct. 22, 2019.

English translation of Written Opinion of the French Searching Authority dated Jul. 25, 2019 for corresponding French Application No. 1860315, filed Nov. 8, 2018.

French Search Report of the French Searching Authority dated Jul. 25, 2019 for corresponding French Application No. 1860315, filed Nov. 8, 2018.

European Notification according to Article 94(3) EPC dated Jul. 3, 2024, for corresponding European Application No. 17 787 000.9.

* cited by examiner

VISUAL INDICATOR SUPPORT AND CORRESPONDING PAYMENT DEVICE

CROSS-REFERENCE TO RELATED APPLICATIONS

This Application is a Section 371 National Stage Application of International Application PCT/EP2019/078664, filed Oct. 22, 2019, which is incorporated by reference in its entirety and published as WO 2020/094382 A1 on May 14, 2020, not in English.

1. FIELD OF THE INVENTION

The present technique relates to the field of payment and more specifically to the field of contactless payment, for example via contactless electronic payment terminals or contactless electronic payment accessories, referred to as payment devices below.

2. PRIOR ART

Contactless payment devices allow a user to carry out a transaction from a bank card or a mobile terminal, for example a smartphone, without inserting the card and without entering the confidential code. Payment, based on NFC ("Nier Field Communication") technology, is made between the chip of the card or smartphone, and the payment device positioned a few centimetres away. Most of the time, the payment device is equipped with a contactless payment logo indicating to the user where to place their card or smartphone.

There is a variety of these payment devices, which are fixed or mobile, and in particular compact payment accessories intended to be fixed to a support, such as a counter or a wall, for example. These payment accessories are for example wired to a communication network, can be power supplied via a power cable, and allow contactless payment when a user brings their smartphone or payment card. Therefore, the contactless payment logo, often affixed to the surface of the payment device, must be correctly oriented, that is to say facing the user when the latter wishes to make a payment.

Conventionally, this contactless payment logo is screen-printed directly on the top cover of the payment device, which restricts the possibilities of positioning the payment device on its support in order to ensure that the user has good readability of the contactless payment logo.

However, these payment devices must also have a small space requirement, which implies design constraints for their architecture. While current techniques allow to benefit from increasingly small electronic components, the connectors, and in particular the cables (networks, power supply, or linked to other functionalities) which connect the payment device to the communication network (or to a power supply source, etc), remains bulky and must be optimised, in order to obtain optimum compactness, and above all minimum thickness. For this purpose, cable entry techniques are used but they sometimes generate a positioning of the cable outlet that is not compatible with a correct orientation of the contactless payment logo.

Therefore, the design of this type of payment devices must take into account a plurality of constraints, among which the security of the payment device, that is to say a device that cannot be dismounted or that is secure with regard to access to the sensitive elements that compose it, the compactness and the good orientation of the regulatory contactless payment logo.

There is therefore a need for a contactless payment device which is compact and ergonomic, while complying with the security constraints related to the contactless payment.

3. DESCRIPTION OF THE INVENTION

The present technique provides an ergonomic and simple means of overcoming the disadvantages of the solutions of the prior art, via a visual indicator support, intended to be assembled irreversibly on an outer face of a payment device. According to the various embodiments of the proposed technique, the support is configured to assume an orientation position wherein, when assembled with the payment device, it is mobile in rotation about an axis substantially perpendicular to the face of the payment device.

Thus, the technique presented proposes a new and inventive solution for the positioning of a visual indicator (for example a contactless payment logo) on a payment device allowing the visual indicator to be orientable while complying with the constraints of security related to payment devices and allowing optimisation of the compactness of the payment device.

For this purpose, the visual indicator is positioned (either screen-printed/printed or glued) on a support intended to be assembled on the cover of the payment device, this support being orientable independently of the payment device. In this way, the visual indicator can be oriented so that it is readable for a user, regardless of the position of the payment device (for example fixed on a wall, on a counter, etc.).

Thus, when designing the payment device itself, it is no longer necessary to take into account the positioning of the visual indicator (which is fixed on the payment device according to the techniques of the prior art), because it is made orientable by the present technique. It is therefore possible in particular to provide the connectors and organisation of the cables (network, power supply, etc.) in the payment device and their exit from the payment device, so that the payment device is as compact as possible.

Finally, the security of the payment device is ensured by the irreversible nature of the assembly, which prevents access to the interior of the payment device. Indeed, once assembled on the payment device, the visual indicator support cannot be dismounted without damaging the payment device itself, thanks to assembly means allowing both to be non-dismountable while being able to assume a mobile orientation position.

According to a particular aspect, the visual indication support comprises assembly means cooperating with receiving means of the payment device, the assembly means having at least one irreversible assembly element intended to cooperate with at least one corresponding irreversible receiving element on the payment device.

Thus, according to this embodiment, the assembly means of the visual indicator support cooperating with receiving means of the payment device, are provided so as to ensure an irreversible assembly of the support, in the locking position described below, thanks to an irreversible assembly element.

The implementation of these assembly means, and of the irreversible assembly element, of the visual indicator support (and of the corresponding receiving means on the payment device) may differ in particular according to the respective shapes of the visual indicator support and the receiving location provided on the payment device.

For example, if the assembly means are formed by a central clip or a central rod (for example when the support is substantially square in shape), the irreversible assembly element is formed by a lug, cooperating with a corresponding irreversible receiving element in the payment device. If the assembly means are formed by circular walls (for example when the support is substantially circular in shape), the irreversible assembly element is formed by elastic elements which deform when inserting the support to "pass" a corresponding irreversible assembly element of the payment device (for example a part of the light guide) and resuming their shape so as to block any removal of the visual indicator support.

According to one particular feature, the support is configured to assume a locking position, when assembled with the payment device, wherein it is not mobile in rotation about the axis.

Thus, according to this embodiment, the visual indicator support can also assume a position wherein it is no longer mobile (and therefore no longer orientable), thus preventing it from assuming an unwanted position. For this purpose, the assembly means, cooperating with the receiving means of the payment device, are provided so as to allow these two orientation and locking positions.

This embodiment applies more particularly to a visual indicator support which cannot be oriented when it is positioned/pressed into a receiving location provided on the payment device, for example when the support and the receiving location both have a non-circular shape (for example a substantially square shape).

According to a particular aspect, the assembly means further have at least one locking element ensuring the locking position.

Thus, according to this embodiment, a locking element is provided on the assembly means, for example a $2^{nd}$ lug on a central clip.

According to a particular embodiment, the visual indicator support has a non-circular shape substantially identical to the shape of a receiving location provided on the outer face of the payment device and, in the orientation position, the support is positioned above the receiving location.

Thus, according to this embodiment, the payment device has a location for receiving the visual indicator support, so that the latter is flush with the surface of the payment device, when it is assembled in the locking position. In this way, the visual indicator support appears to be an integral part of the payment device and cannot be moved by mistake when the payment device is being used (for example when a user presents their payment card or their smartphone).

Thus, when the visual indicator support is square in shape, it cannot move when in a receiving location having the same shape. It can only move when it is partially removed from this location. For more security, the support can therefore only be partially dismounted to orient it: it is lifted a little to be rotated then it is pushed in to be fixed, it is captive and the security of the payment device is ensured.

According to a particular aspect, the support is assembled to the payment device in a receiving location formed by a light guide provided on the outer face of the payment device and the support is mobile in rotation independently of the light guide, in the orientation position.

Thus, according to this embodiment, the security of the payment device is ensured thanks to the independence of the visual indicator support with respect to the light guide which allows the backlighting, which ensures the protection in particular of the electric card of the payment device. For this purpose, the light guide is solid under the visual indicator support, including at the element(s) for fixing the support in the payment device, so that the interior of the payment device is not accessible even when the visual indicator support is dismounted.

According to one particular feature, the support has an outer face carrying a visual indicator and an inner face and the assembly means are formed by a rod extending from the inner face of the support, the rod comprising at least two branches spaced by a clearance and each having at least one of the irreversible assembly elements.

Thus, according to this embodiment, the means for assembling the support on the payment device are formed by a clip or a rod, central or not, formed of two branches, so as to allow the support to assume the different orientation, assembly and locking positions.

In addition, each branch has for example at least one lug on its outer face to allow irreversible assembly, this lug cooperating for example with a narrowing of the passage in the payment device, preventing the removal of the visual indicator support from the payment device.

For example, the branches also each have at least one of the locking elements.

Thus, according to this embodiment, each branch forming the means for assembling the support on the payment device also has, for example, at least one second lug on its outer face to allow the support to be locked in the payment device, this second lug cooperating for example with a narrowing of the passage, in the payment device, which may be the same as that allowing the irreversible assembly.

According to a particular aspect, the visual indicator support has a substantially circular shape and an outer face carrying the visual indicator and an inner face and the assembly means are formed by at least a portion of a ring extending substantially perpendicularly from the inner face of the support, the portion having at least one of the irreversible assembly elements.

Thus, according to this embodiment, the visual indicator support is of substantially circular shape and the assembly means are formed by at least one rounded wall, for example one or more portions of a sort of ring, circular as the visual indicator support. Such a visual indicator support can assume a plurality of positions, in a location which is also circular of substantially identical size.

Thus, for example, when the visual indicator support and the receiving location are both substantially circular in shape and of substantially the same size, the visual indicator support can be mobile even when fully pressed into the receiving location. In this case, moreover, the orientation and locking positions correspond in fact only to a single position, and the corresponding assembly and receiving means must simply be provided to allow the irreversible assembly of the support on the payment device.

According to a particular aspect, the visual indicator support has gripping means on its outer face.

Thus, according to this embodiment, one or more attachment elements are present on the outer surface of the visual indicator support, allowing in particular, when it is circular in shape, to rotate it in its location, even if it does not protrude from this location.

This technique also relates to a payment device comprising:

- a receiving location for a visual indicator support intended to be assembled irreversibly on an outer face of the payment device, and
- means for receiving the visual indicator support.

In addition, the payment device is configured so that the visual indicator support assumes an orientation position wherein, when assembled with the payment device, it is mobile in rotation about an axis substantially perpendicular to the outer face of the payment device.

Thus, the present technique also relates to a payment device configured to receive a visual indicator support as described above. For this purpose, the payment device must be shaped on the one hand to receive the visual indicator support, but also to keep it fixed while allowing its orientation.

The payment device must therefore not only have a location for receiving the part of the visual indicator support having the logo, so that the visual indicator support does not protrude from the surface of the payment device, once assembled, but also at least one location for receiving the elements for fixing the visual indicator support.

According to a particular aspect, the receiving means comprise at least one irreversible receiving element intended to cooperate with at least one irreversible assembly element of the support.

Thus, according to this embodiment, the payment device has irreversible assembly means corresponding to those provided on the visual indicator support, such as for example:

- in the embodiment of the non-circular visual indicator support, a narrowing of the cylinder wherein the rod forming the assembly means is positioned, preventing the removal of the support thanks to the fact that the lug on the rod, corresponding to the irreversible assembly element, cannot pass the narrowing in the direction of the removal;
- in the embodiment of the circular visual indicator support, a sort of collar formed in the light guide that the assembly means of the visual indicator support can pass through, during assembly, thanks to the deformable elastic parts but which do not allow removal of the visual indicator support, because the payment device does not have access underneath to bring out the visual indicator support, and the visual indicator support itself does not have sufficiently prominent gripping means for a user to be able to extract it completely from the device once assembled.

According to one particular feature, the receiving means comprise at least one locking receiving element intended to cooperate with at least one locking element of the support.

Thus, according to the first embodiment (non-circular visual indicator support), it is the same element as that of irreversible assembly, that is to say for example a narrowing. However, because the locking lug is smaller than the irreversible assembly lug, the locking lug can pass through the narrowing in the direction of removal.

As the 2$^{nd}$ embodiment (circular visual indicator support) does not have a locking position, the payment device does not have a locking receiving element.

According to a particular aspect, the receiving location is formed by a light guide preventing access to the interior of the payment device.

Thus, according to this embodiment, provision is made for the location for receiving the visual indicator support, in the payment device, to be formed by a solid light guide, thus ensuring the protection of the electronic card of the payment device by preventing any access to the electronic card when the visual indicator support is removed.

Thus, such a payment device is configured to receive a visual indicator support as described above, according to the different embodiments.

The present technique therefore also relates to a system comprising a visual indicator support assembled to a payment device, as described above, according to the various embodiments.

4. LIST OF FIGURES

These features, as well as others, will appear more clearly upon reading the following description of an embodiment, given by way of simple illustrative and non-limiting example, and the appended figures, among which:

FIGS. 1*a* to 1*d* illustrate an example of a payment device having a visual indicator support according to a first embodiment, in four orientation positions of the visual indicator support on the payment device;

Figure 4D:
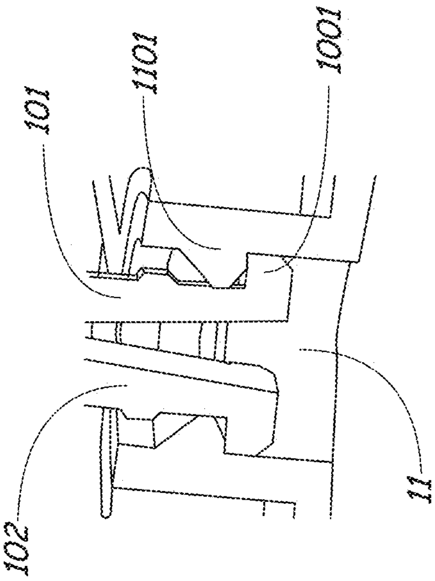
Figure 4B:
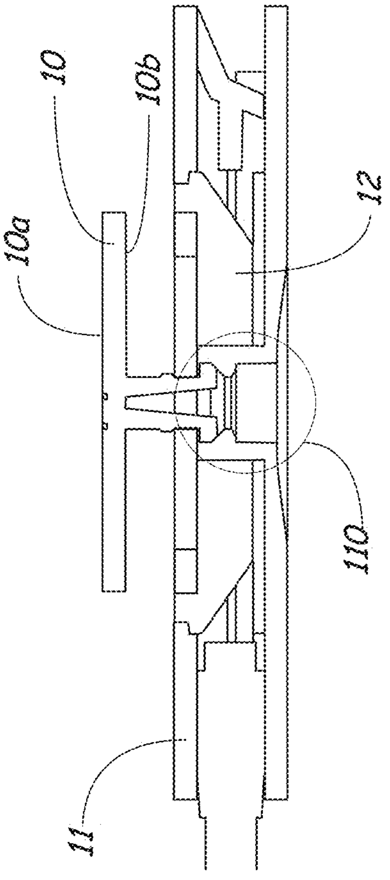
Figure 4A:
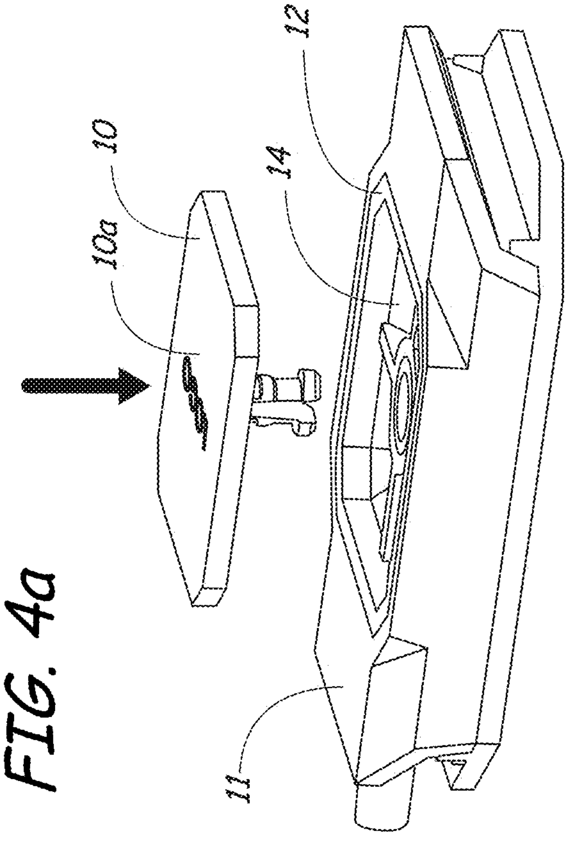
Figure 4C:
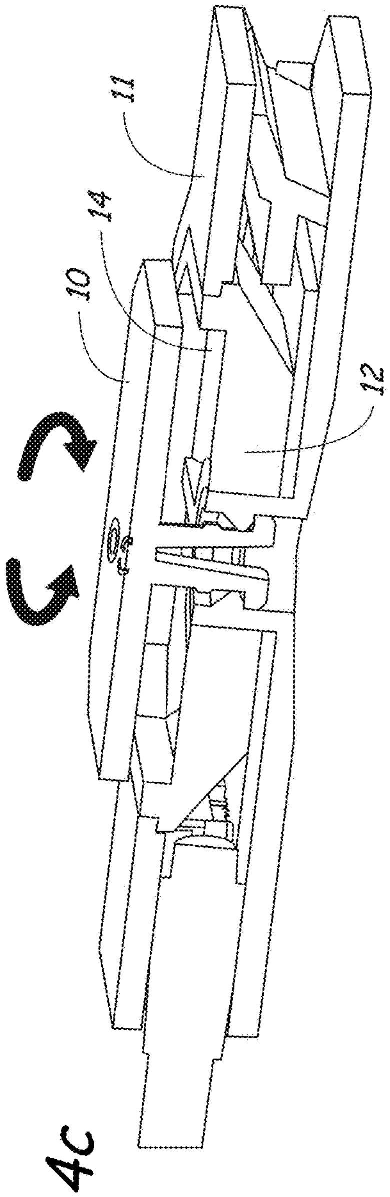

FIGS. 4*a* to 4*f* show different steps of assembling a visual indicator support, according to the first embodiment, on a payment device:

FIG. 4*a*: unassembled visual indicator support and payment device;

FIG. 4*b*: sectional view of the installation position of the visual indicator support in the payment device;

FIG. 4*c*: sectional view of the orientation position of the visual indicator support in the payment device;

FIG. 4*d*: detail of FIG. 4*c;*

Figure 4F:
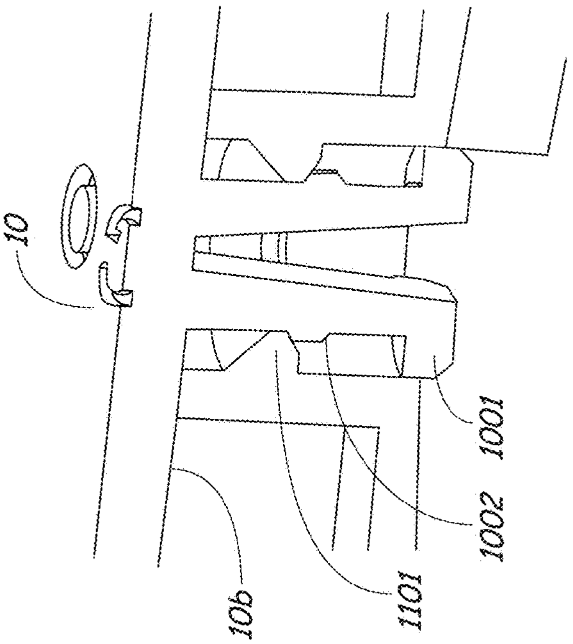
Figure 4E:
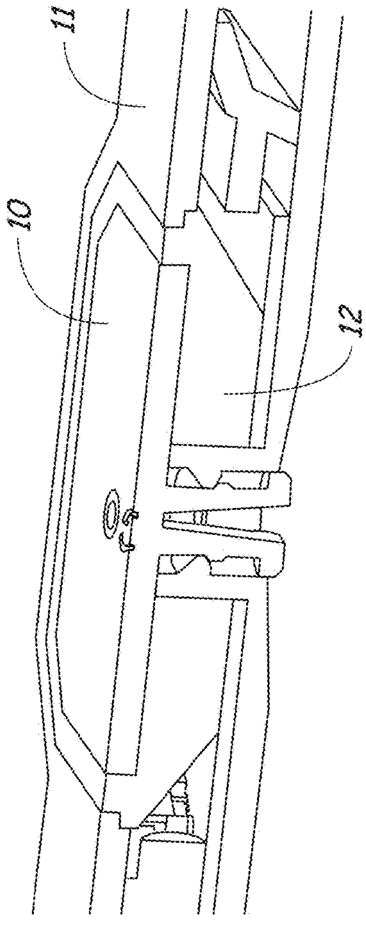

FIG. 4*e*: sectional view of the locking position of the visual indicator support in the payment device;

FIG. 4*f*: detail of FIG. 4*e*.

Figure 5:
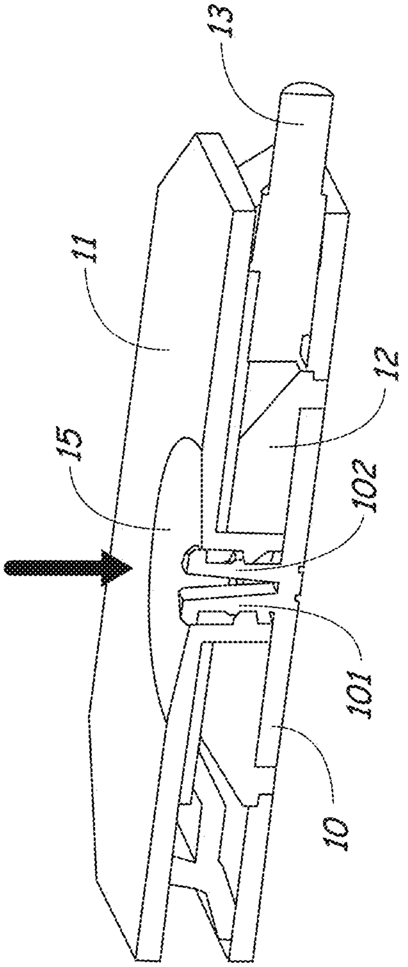
Figure 6B:
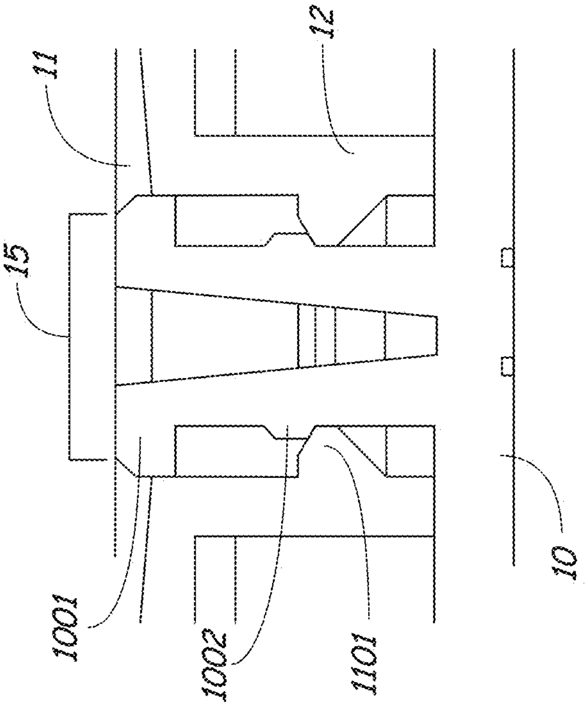
Figure 6A:
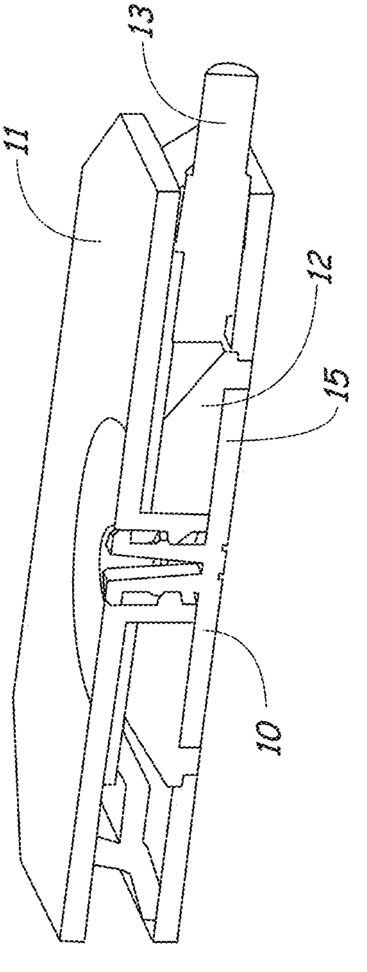
Figure 7A:
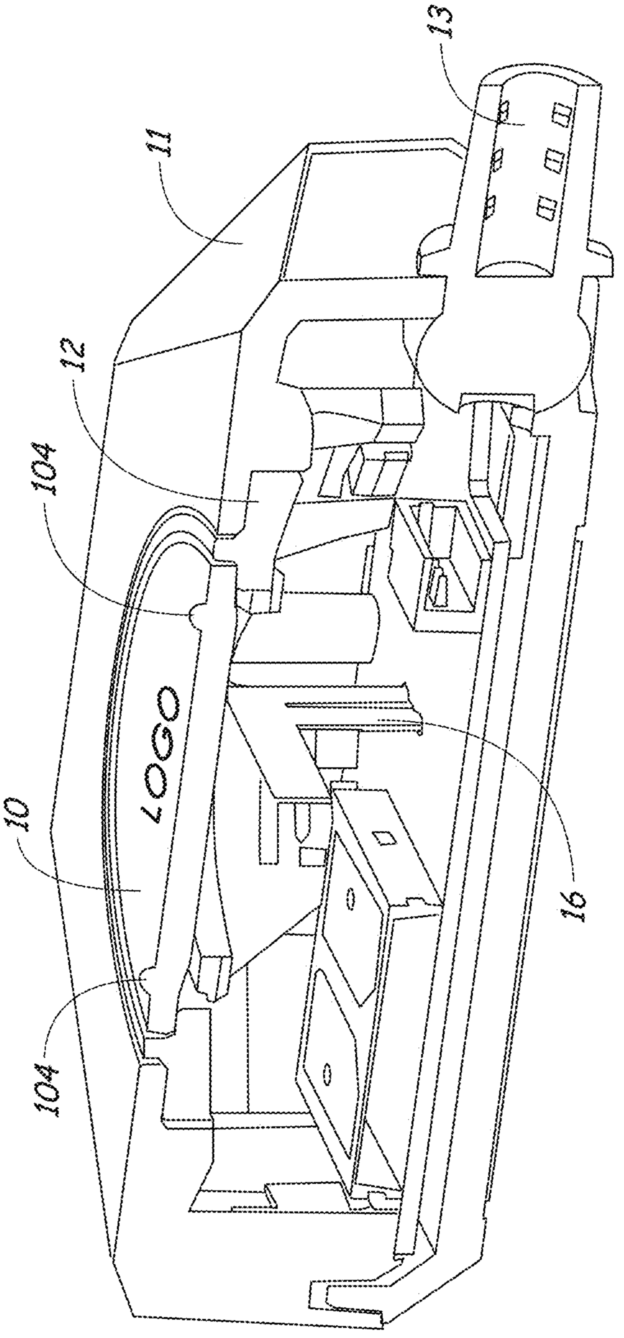
Figure 7B:
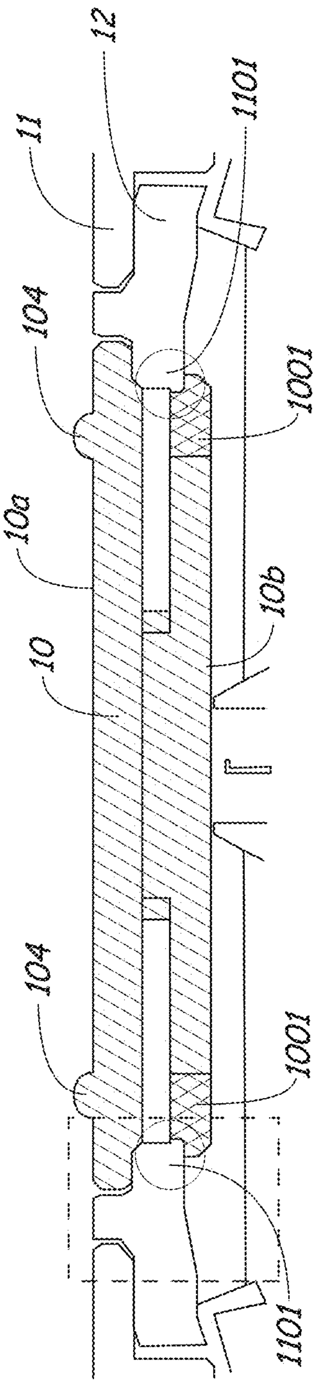

FIG. 5 and FIGS. 6*a* and 6*b* illustrate means for unlocking the visual indicator support, according to a first and a second variant;

FIGS. 7*a* to 7*d* illustrate a visual indicator support according to the second embodiment:

FIG. 7*a*: sectional view of a visual indicator support assembled to a payment device;

FIG. 7*b*: detail of FIG. 7*a;*

Figure 7C:
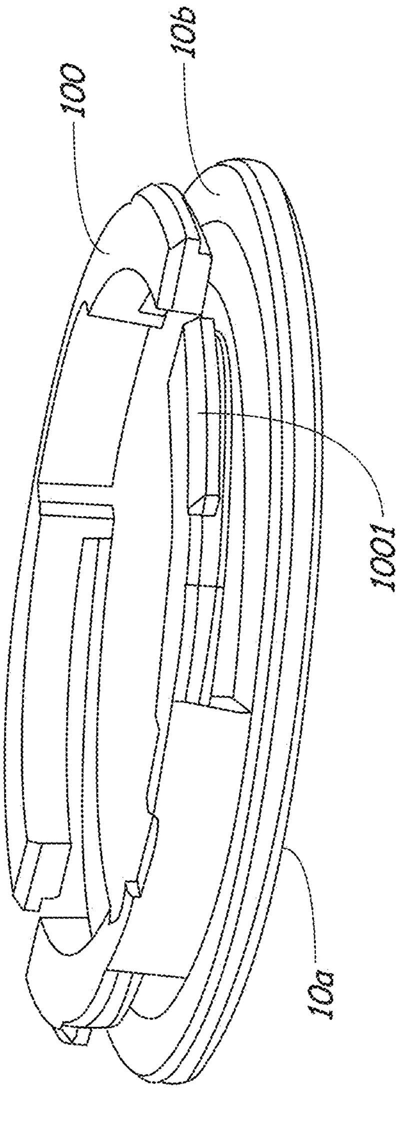
Figure 7D:
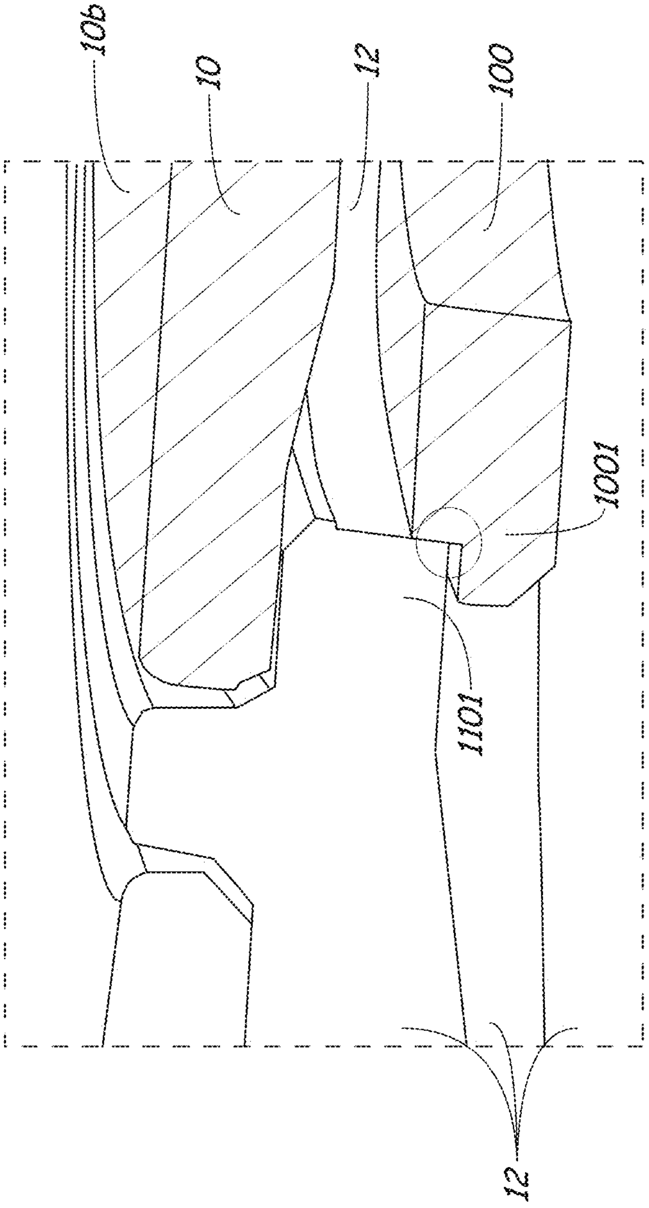

FIG. 7*c*: visual indicator support;

FIG. 7*d*: detail of FIG. 7*b*.

Figure 8A:
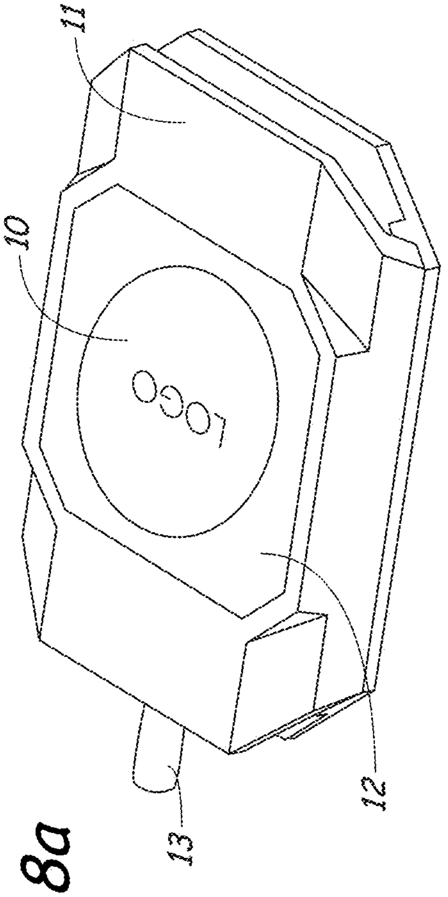
Figure 8B:
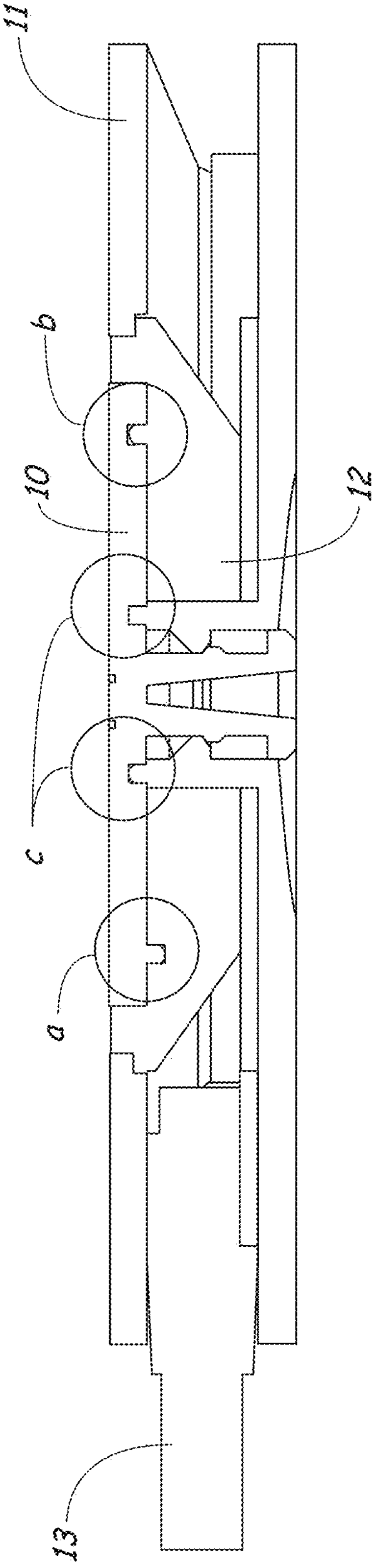
Figure 8C:
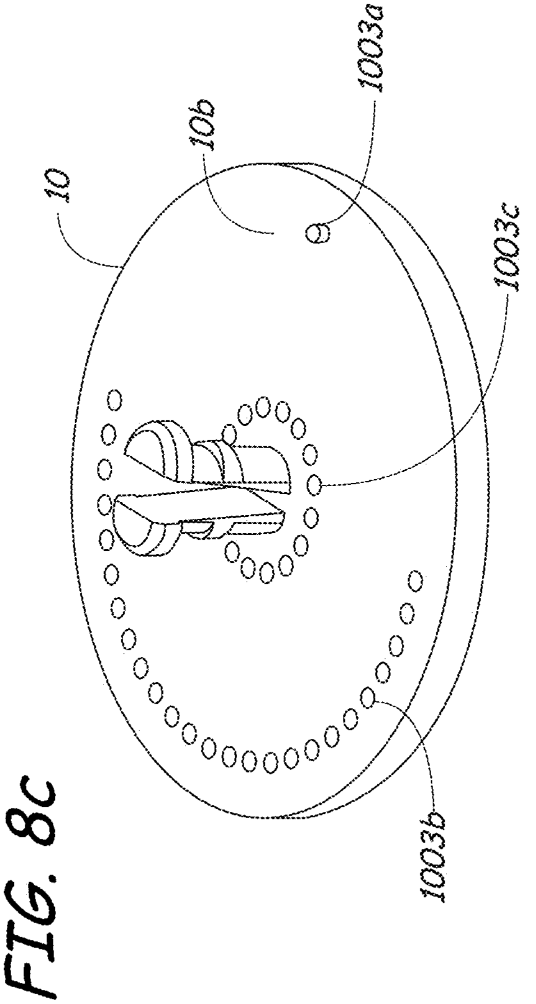
Figure 8E:
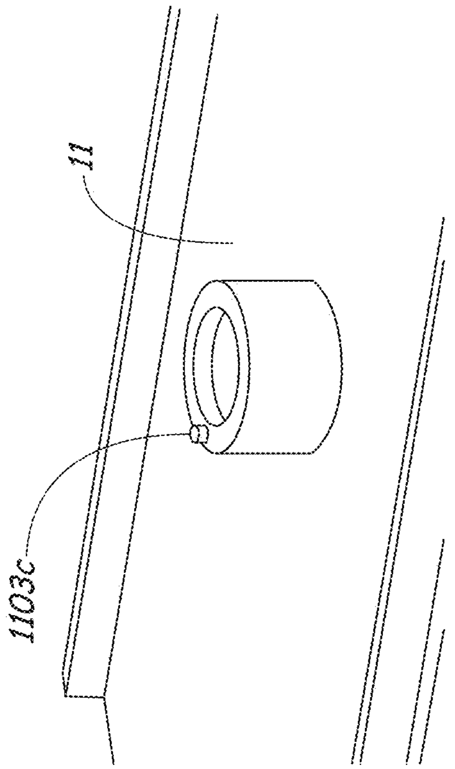
Figure 8D:
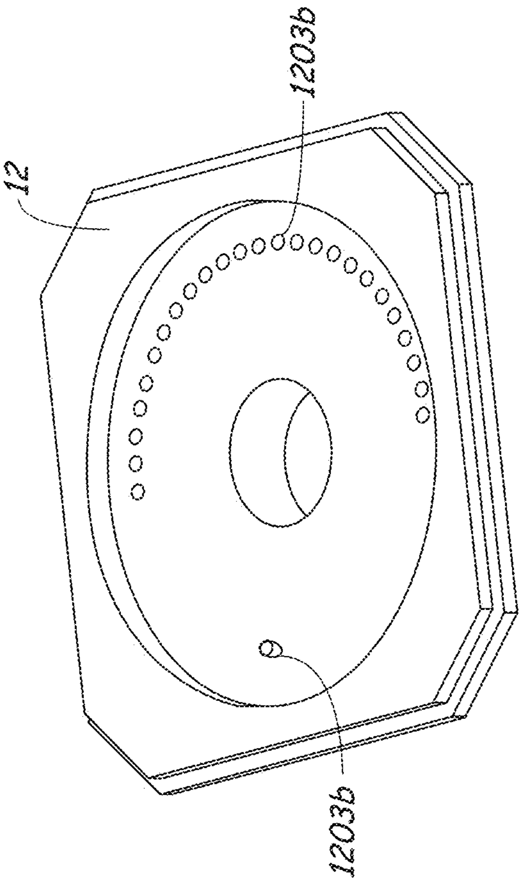

FIGS. 8*a* to 8*e* illustrate a third embodiment:

FIGS. 8*a* and 8*b* illustrate a visual indicator support assembled to a payment device, according to this third embodiment;

FIG. 8*c* illustrates a visual indicator support according to this third embodiment;

FIGS. 8*d* and 8*e* respectively illustrate a light guide and part of a corresponding payment device, according to this third embodiment.

5. DESCRIPTION OF AN EMBODIMENT OF THE INVENTION

5.1. General Principle

The general principle of the present technique lies in the possibility of orienting a visual indicator on a payment device, in order to make it visible to users, regardless of the position of the payment device and without requiring constraints on the architecture/the design of the payment device itself. A visual indicator within the meaning of this technique corresponds, for example, to a contactless payment logo, an advertising logo, or even a warning related to the use of the payment device.

For this purpose, the technique provides an orientable visual indicator support when it is assembled to the payment device.

In addition, the present technique allows to comply with the security constraints of payment devices, thanks to a particular configuration of the payment device and more particularly of the location provided for receiving the visual indicator support, via a light guide. The security of the payment device having such a visual indicator support is also ensured by the irreversible nature of the assembly provided by this technique. Indeed, as described below, the visual indicator support cannot be removed from the payment device without damaging both of them. However, if the payment device is damaged, the known intrusion detection techniques are therefore activated, then preventing the use of the payment device.

Thus, the proposed technique, according to its various embodiments illustrated by the various figures described below, proposes a visual indicator support 10 intended to be assembled irreversibly on an outer face of a payment device 11, the support 10 being configured to assume an orientation position wherein, when assembled with the payment device 11, it is mobile in rotation about an axis substantially perpendicular to the face of the payment device 11. In this way, the visual indicator can always be oriented so as to be visible to users, regardless of the orientation of the payment device itself, since the visual indicator support is orientable independently of the payment device to which it is assembled.

In relation to FIGS. 1*a* to 1*d* and FIG. 2, two examples of a visual indicator support assembled to a payment device (two examples of a system comprising a visual indicator support assembled to a payment device) are presented, respectively in a first and a second embodiment.

FIGS. 1*a* to 1*d* illustrate a visual indicator support 10 of substantially square shape, assembled to a payment device 11 also of substantially square shape, in four different orientation positions of the visual indicator ("LOGO"). Thus, it can be seen that for an identical position of the cable outlet 13 of the payment device, which, conventionally, imposes the position of the payment device on its support (for example a wall, a counter of a merchant, etc.) to ensure the connections, the visual indicator can be oriented in four different ways.

Thus, the visual indicator support and the payment device according to this first embodiment allow to orient the visual indicator, or the logo, in an ergonomic manner for the user, regardless of the position of the payment device.

In addition, a light guide 12, present in the payment device, allows the backlighting of the visual indicator, for example over its entire perimeter, thus optimising ergonomics for the user, while ensuring the security of the interior of the payment device, as described in more detail below.

These FIGS. 1*a* to 1*d* illustrate a substantially square visual indicator support, but other geometric shapes, not circular, are compatible with this first embodiment. Indeed, this non-circular shape of the visual indicator support, and of the corresponding location in the payment device, allows the visual indicator support to assume a locking position, when it is assembled with the payment device, wherein it is not mobile in rotation about the axis substantially perpendicular to the face of the payment device. Thus, when the visual indicator support is pressed into its location on the payment device, it can no longer be oriented because its edges abut against the edges of the location provided in the payment device. This configuration therefore allows, as described in more detail below, the visual indicator support to assume an orientation position and a locking position.

Figure 2:
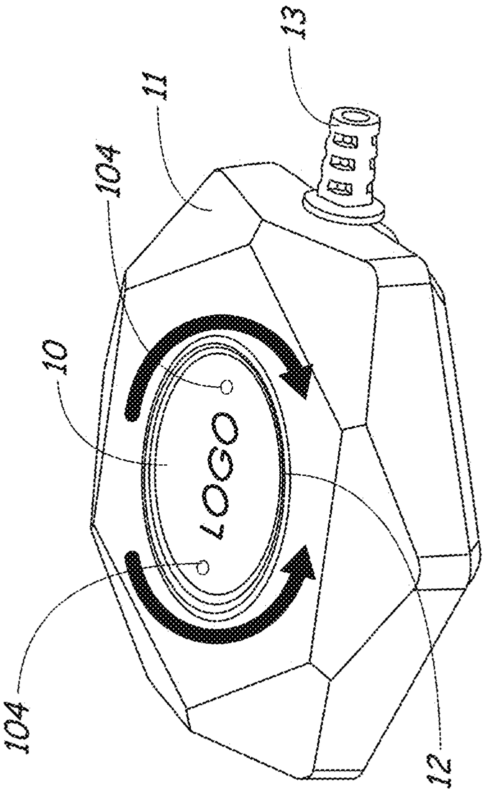
FIG. 2 illustrates an example of a payment device having a visual indicator support according to a second embodiment.

FIG. 2, in turn, illustrates, according to a second embodiment, another example of a system comprising a visual indicator support 10 of substantially circular shape, assembled to a payment device 11 also of more rounded shape than in the first embodiment illustrated in FIGS. 1*a* to 1*d*. In this FIG. 2, the visual indicator, also backlit by a light guide 12 present in the payment device, is mobile in rotation in the direction of the arrows illustrated in thick black lines, thus allowing the positioning of the visual indicator ergonomically for the user, regardless of the position of the payment device. As indicated above in relation to the first embodiment, the cables extending out of the payment device through the outlet 13 do not constrain the position of the visual indicator, which is mobile independently of the payment device on which it is assembled, thanks to its support 10 described below.

5.2 Description of a First Embodiment

A visual indicator support 10 is now presented in more detail according to the first embodiment described above, as illustrated in FIG. 3.

Figure 1B:
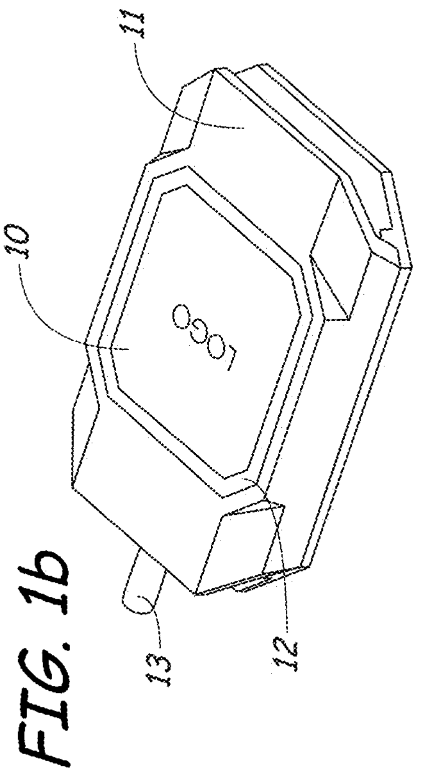
Figure 1D:
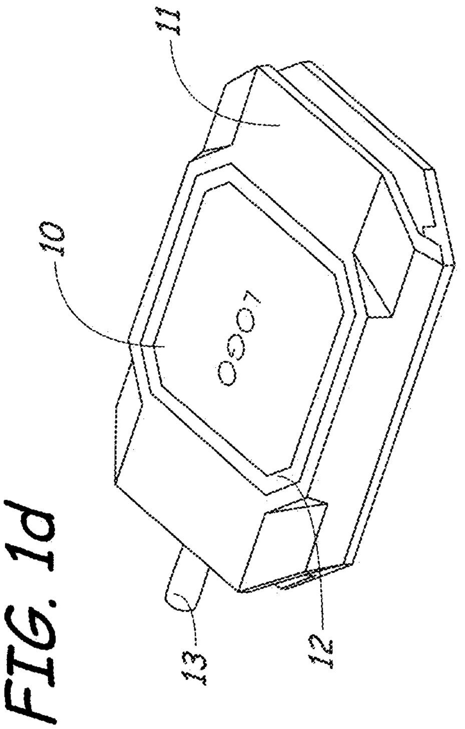
Figure 1A:
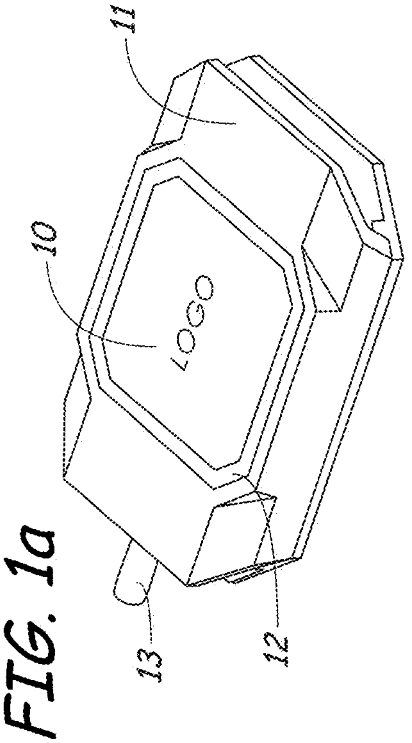
Figure 1C:
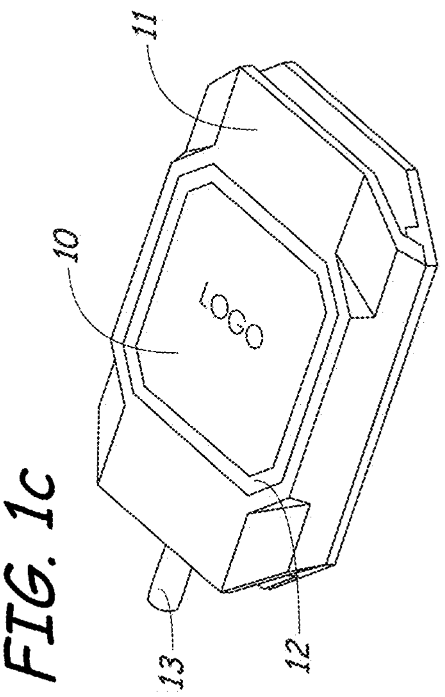
Figure 3:
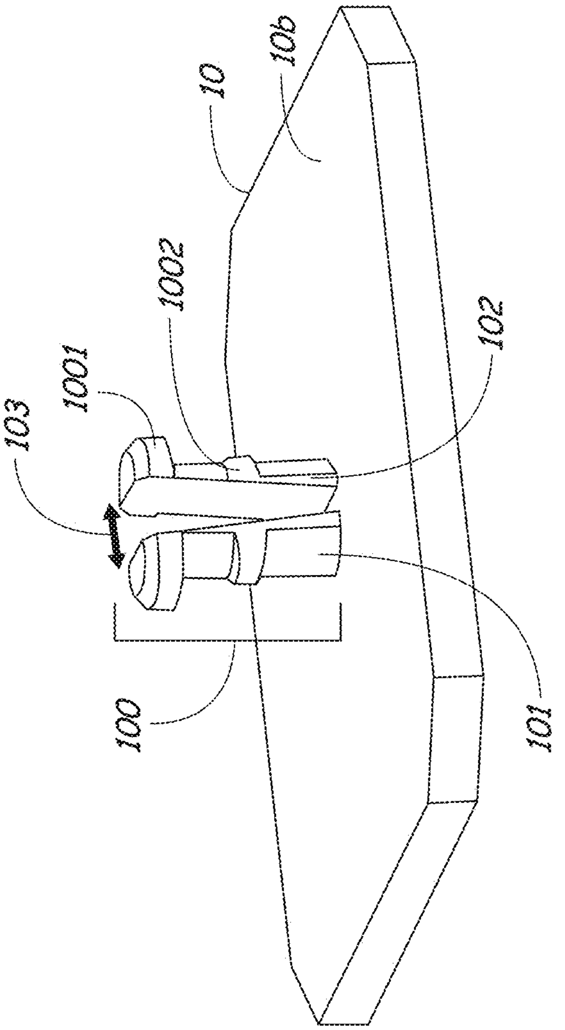
FIG. 3 shows a visual indicator support according to the first embodiment.

This FIG. 3 shows a view of the inner face 10*b* of a visual indicator support 10, that is to say the face opposite to that on which the visual indicator appears.

The assembly of the visual indicator support to the payment device is ensured by assembly means 100 cooperating with receiving means 110 of the payment device (not shown in FIG. 3). Indeed, the visual indicator support 10 must be maintained in the payment device, so that the visual indicator is always visible to users.

In the particular variant illustrated in FIG. 3, the assembly means 100 are formed by a rod, or a clip, extending from this inner face 10*b* of the support. This rod includes for example two branches 101 and 102 spaced by a clearance 103, allowing a variable displacement of these two branches, for example to be able to engage in narrow passages when assembling the visual indicator support to the payment device.

In addition, as already indicated, the proposed technique provides for the assembly of the visual indicator support to the payment device to be irreversible, thanks to at least one irreversible assembly element 1001, carried by the assembly means 100. In order to ensure the irreversible assembly, this irreversible assembly element 1001 is intended to cooperate with at least one corresponding irreversible receiving element 1101 on the payment device (not illustrated in FIG. 3).

According to this variant illustrated in FIG. 3, each branch 101 and 102 has, at its free end, an irreversible assembly element 1001, in the form of a lug. These two lugs allow, as described below, to keep the visual indicator support and the payment device assembled, thanks to a narrowing in the passage provided in the payment device to receive the rod of the visual indicator support. The proposed technique thus provides elements on the visual indicator support and on the payment device which have shapes and sizes adapted to cooperate so as to ensure such an operation.

Finally, such a visual indicator support is configured to assume the following two positions:

- an orientation position, wherein it is mobile in rotation about an axis formed for example by the rod 100, when it is held above the receiving location provided in the payment device, and a locking position wherein it is no longer mobile in rotation, therefore no longer orientable, because it is pressed into this location of the payment device.

This locking position requires specific means formed by at least one locking element 1002, illustrated for example in FIG. 3 by a second lug, located on each of the branches 101 and 102, approximately at mid-height.

As illustrated in FIG. 3 and described in more detail below, this locking element 1002 formed by a lug is less prominent than the first lug 1001 forming the irreversible assembly element, because it is "disengageable" to allow the return to the orientation position.

The various positions of the visual indicator support, as well as the interactions between the elements of the visual indicator support and the payment device, are illustrated in particular by FIGS. 4*a* to 4*f* described now.

FIG. 4*a* illustrates a visual indicator support 10 and a payment device 11 not yet assembled, the thick black line arrow representing the direction of assembly. This FIG. 4*a* also illustrates the light guide 12 which, according to this variant embodiment, constitutes the receiving location 14, in the device 11, of the visual indicator support 10. Thus, as already indicated, this light guide 12 allows to ensure the security of the payment device 11, even when the visual indicator support 10 is not assembled. Indeed, according to this variant, the light guide 12 completely prevents access to the interior of the payment device 11, including at the means 100 (for example the rod formed of two branches as described above) for assembling the visual indicator support 10 to the payment device 11.

This implementation of the light guide 12 as a receiving location 14 of the visual indicator support 10 allows the implementation of the invention while complying with the constraints of securing a payment device. Indeed, the implementation of a visual indicator support which can assume in particular an orientation position wherein it is above its location could generate a security breach, if this allowed access to the inside of the payment device, which is not the case according to the proposed technique.

FIG. 4*b* illustrates the installation position of the visual indicator support 10 in the payment device 11 and allows in particular to illustrate the positioning of the means 100 for assembling the visual indicator support in the receiving means 110 of the payment device. In this variant, for example, the receiving means 110 are formed by a sort of cylinder in the light guide 12, this cylinder having at least one narrowing 1101 intended to cooperate with the various lugs 1001, 1002, provided on the assembly means 100 of the visual indicator support 10. Thus, the assembly means 100 can not only move longitudinally along an axis perpendicular to the surface of the payment device 11, to ensure the assembly and then the locking of the visual indicator support 10, but also in rotation along the same axis, in order to ensure the orientation of the visual indicator positioned on the outer face 10*a* of the visual indicator support 10.

This FIG. 4*b* therefore shows the engagement of the two branches 101 and 102 of the visual indicator support 10 in the receiving cylinder 110 of the payment device 11.

Then, when these two branches 101 and 102 continue their engagement to arrive at the orientation position of the visual indicator support 10 illustrated, in section, in FIG. 4*c*, the clearance 103 decreases so that the irreversible assembly means 1001 (for example lugs) of each of these two branches 101 and 102 can cross the narrowing 1101 formed in the cylinder 110.

Thus, in this orientation position illustrated in FIG. 4*c*, the visual indicator support 10 is located slightly above the receiving location 14 and can therefore rotate freely, as indicated by the thick black line arrows.

Due to the substantially square shape of both the visual indicator support 10 and the receiving location 14, the visual indicator support 10 can assume four different positions, as illustrated in FIGS. 4*a* to 4*d* already described.

FIG. 4*d* allows to show the detail of the assembly interactions between the visual indicator support 10 and the payment device 11, in the orientation position shown in FIG. 4*c*. Thus, it is clearly seen that the lugs 1001 (irreversible assembly elements) carried by the branches 101 and 102 have crossed the narrowing 1101 (irreversible receiving element) and that the branches 101 and 102 have resumed their rest position, the clearance 103 allowing to maintain the two lugs in the blocking position, thanks to their upper flat section, under the narrowing 1101.

This orientation position therefore allows in particular the merchant who wishes to use the payment device, or the installer of the payment device, to position the visual indicator so that it is visible to users, once the position of the payment device itself is determined. For example, when the payment device corresponds to a contactless payment terminal fixed to a wall, the installer is forced to take into account in particular the cable outlet 13 to determine the position of the payment device 11, in order to ensure connections optimally. Once the position of the payment device 11 is determined, they can then orient the visual indicator support 10 so that the visual indicator corresponding to the contactless payment logo is in the right direction for users. According to another example, when the payment device 11 is fixed on a counter of a merchant, the latter also determines the position of the payment device 11 according to the outlet of the cables and the connections to be made. Here again, once the payment device 11 is positioned correctly to ensure these connections, the merchant can then orient the visual indicator support 10 so that the visual indicator corresponding to the contactless payment logo is in the right direction for the users.

In the two examples described above, once the optimum orientation is chosen for the visual indicator support 10, the latter must no longer be mobile during the operation of the payment device 11. The visual indicator support 10 must therefore be able to assume a locking position in the payment device 11, as illustrated by the sectional view of FIG. 4*e*. For this purpose, the installer or the merchant presses on the visual indicator support 10 so that it fits into its receiving location 14 of the payment device 11, and that it no longer protrudes from the surface of the payment device 10.

As illustrated in FIG. 4*f*, this locking position is ensured by the fact that the locking elements 1002 of each of the branches 101 and 102 of the visual indicator support 10 have also crossed the narrowing 1101 provided in the receiving means 110 of the payment device. Thus, the inner face 10*b* of the visual indicator support 10 is in contact with the receiving location 14 of the payment device 11.

The present technique also provides means allowing the visual indicator support 10 to switch from this locking position, corresponding to the use of the payment device 11, to the orientation position already described, for example when the payment device 11 must be moved and this results in the need to orient the visual indicator to a different position.

For this purpose, a first variant consists in providing an unlocking area 15 formed on the outer surface of the payment device 11 opposite to that receiving the visual indicator support 10, that is to say at the back of the payment device 11, as illustrated in FIG. 5. This unlocking area 15 consists for example of a slightly curved area around the end of the rod 100 of the visual indicator support 10 so that the latter protrudes a little and is accessible to external pressure. This unlocking area 15 may be more or less wide around the end of the rod 100 of the visual indicator support 10, depending on the size of the payment device 11 for example, or taking into account more aesthetic considerations, as long as it allows access to the end of the visual indicator support 10 to unlock it.

In this way, it suffices to exert pressure, indicated by the thick black line arrow, on the end of the two branches 101 and 102 so that they come closer to one another, thanks to the displacement made possible by the clearance 103, and that the two locking elements 1002 thus cross the narrowing 1101. This pressure can be exerted for example by a finger of the installer or the merchant. Switching from the locked position to the orientation position thus does not require any specific tool, while being secure in the sense that this switching cannot be carried out accidentally by simply touching the back of the payment device or even by a simple handling of the payment device. A specific pressure action, precisely at the unlocking area, is necessary.

According to another variant, illustrated by FIGS. 6*a* and 6*b*, the unlocking area 15 of the payment device 11 consists only of an opening at the surface of which the end of the rod 100 of the visual indicator support 10 does not protrude (FIG. 6*b*). According to this variant, unlocking is only possible by using a tool to put pressure on the end of the two branches 101 and 102 of the rod 100 of the visual indicator support 10, causing the same mechanisms as those described in the previous variant, namely bringing together the two branches 101 and 102 allowing the passage of the narrowing 1101 by the locking elements 1002 of the rod 100.

5.3 Description of a Second Embodiment

A visual indicator support 10 is now presented in more detail according to the second embodiment already mentioned in relation to FIG. 2, and as illustrated in FIGS. 7*a* to 7*d*.

According to this second embodiment, the visual indicator support has a substantially circular shape, as does the receiving location 14 provided on the payment device 11.

As for the first embodiment, the visual indicator support 10 has an outer face 10*a* carrying said visual indicator and an inner face 10*b*.

On the other hand, the assembly means 100 are different from those described according to the first embodiment. This difference is explained in particular by the fact that the circular shape of the visual indicator support causes a different operation.

Thus, due to this shape which is substantially circular and substantially identical to that of the receiving location 14 provided in the payment device 11, the visual indicator support 10 can assume a plurality of positions and can be oriented without requiring to be maintained above this location 14. Thus, the orientation position also corresponds to the locking position. This second embodiment therefore no longer requires separate irreversible assembly and locking means. In addition, this second embodiment allows the visual indicator support 10 to no longer pass through the payment device 11, reinforcing the security of the payment device 11 and allowing the implantation of components in the payment device 11, under the visual indicator support 10 (see below).

Thus, according to this second embodiment, the assembly means 100 are formed by one or more portions of a ring extending substantially perpendicularly from the inner face 10*b* of the visual indicator support 10, as can be seen more particularly in FIG. 7*c*. Several variants not shown are possible, such as for example a more central ring or ring portions smaller than those illustrated in FIG. 7*c*.

This implementation of the assembly means 100 allows in particular, as illustrated in the sectional view of FIG. 7*a* (where the visual indicator support 10 is assembled to the payment device 11), to be able to install an antenna 16 within the payment device 11, protected by the visual indicator support 10 and the light guide 12 of the payment device 11. Indeed, the implementation of the assembly means by a central rod, as for the first embodiment, although conceivable, would not allow the installation of this antenna 16.

According to this second embodiment, the assembly means 100 also have at least one irreversible assembly element 1001, also implemented in a different manner compared to the first embodiment.

Thus, as illustrated in the sectional view of FIG. 7*b* as well as in FIG. 7*c*, the irreversible assembly elements 1001 correspond to elastic, deformable parts, shown in hatched dark grey in FIG. 7*b* (the rest of the visual indicator support 10 being represented in striped lighter grey), located on the outside of the ring portions and allowing:

- on the one hand to position the visual indicator support 10 in the payment device 11, allowing the irreversible receiving means 1101 provided in the payment device 11 to be crossed when pressure is exerted on the visual indicator support 10 to insert it into the payment device 11, and
- on the other hand to maintain the visual indicator support 10 in this irreversible assembly position by preventing the irreversible receiving means 1101 from being crossed in the direction of removal of the visual indicator support 10 and thus retaining the ring portions under these irreversible receiving means 1101.

This is indicated in FIG. 7*b* by two thick black line circles centred on the place where the elastic parts 1001 of the assembly means 100 formed by ring portions are retained under the irreversible receiving means 1101 of the payment device 11.

According to this second embodiment, the assembly means 100 therefore rotate at the same time as the visual indicator support 10 when it is oriented.

Therefore, according to another variant, provision is also made of braking means, for example by friction, so as to prevent the visual indicator support 10 from rotating without this being intended (for example when a user touches the payment device, and therefore the visual indicator support, during its use, by placing their payment card for example).

These braking means are shown in the thick black line circle, in FIG. 7*d*, which illustrates an enlarged view of the part of FIG. 7*b* framed in dotted lines. Any other braking means can be implemented to slow down the rotation of the visual indicator support 10 and thus prevent its misguided and unwanted displacement.

Moreover, in order to ensure the proper functioning of this second embodiment, gripping means 104 are provided on the outer face 10*a* of the visual indicator support 10, so as to facilitate its orientation. Indeed, the visual indicator support 10 being fitted in the receiving location 14 provided in the payment device 11, these gripping means 104 make it easier to rotate it in this location 14, in particular when braking means as described above are implemented. These gripping means 104 may correspond, for example, to raised attachment points for the finger of the installer or the merchant who wishes to orient the visual indicator support 10 once the payment device 11 is positioned for use. These attachment points can take any shape that allows a user to rotate the visual indicator support into place.

It should be noted that these gripping means 104 can also be provided on the visual indicator support 10 described in relation to the first embodiment, even if their usefulness is less important due to the obligation to maintain the visual indicator support 10 above the receiving location 14 to orient it.

5.4 Description of a Third Embodiment

Finally, according to a third embodiment, illustrated in FIGS. 8*a* to 8*e*, the visual indicator support 10 is circular in shape and the assembly means 100 consist of a central rod (as in the first embodiment). Means for indexing the orientation 1003 (types a, b or c) are therefore provided under the visual indicator support 10 in order to stabilise it. Indeed, in the second embodiment, the deformable elastic parts, as well as optionally the braking means, allow a precise and stable rotational movement of the visual indicator support and also a precise and stable positioning in the chosen position. On the other hand, when the visual indicator support 10, of circular shape, includes a central rod to be assembled to the payment device 11, its orientation and especially its stability in the chosen position are more difficult to obtain because the central rod is very mobile in the receiving means provided on the payment device. It is therefore preferable to be able to index the various orientation positions, for example via indexing fingers (1003*a*) or grooves or holes (1003*b* and 1003*c*), or any other indexing principle located under the visual indicator support 10. These indexing principles can be implemented either between the visual indicator support 10 and the light guide 12 (ideal from a mechanical point of view), or with any other part of the payment device 11.

In order to limit the number of figures, FIGS. 8*b* to 8*c* illustrate several different types of indexing, but, advantageously, only one type is implemented for a visual indicator support 10 and a payment device 11.

Thus, in FIG. 8*b*, there are three different types of indexing: a, b and c, described more precisely below.

FIG. 8*c* illustrates, on the same visual indicator support, these three types of indexing that can be implemented, namely:

- type a: an indexing finger 1003*a*;
- type b: a plurality of peripheral indexing holes 1003*b*, and
- type c: a plurality of central indexing holes 1003*c*.

Finally, to each type of indexing corresponds an equivalent element on the payment device 11, or more advantageously on the light guide 12, as illustrated in FIGS. 8*d* and 8*e*.

Thus, a plurality of holes 1203*a* in the light guide 12 corresponds to the indexing finger 1003*a* in the visual indicator support 10, and a finger 1203*b* of the light guide 12 corresponds to the plurality of holes 1003*b*, as illustrated in FIG. 8*d*.

FIG. 8*e* in turn illustrates a finger 1103*c* of the payment device 11 corresponding to the plurality of holes 1003*c* of the visual indicator support 10.

Other types of indexing can of course be implemented to allow stability of the orientation of the visual indicator support when assembled to the payment device.

5.5 Payment Device

The proposed technique also relates, as already described above, to a payment device 11 configured/adapted to receive a visual indicator support 10 as described above according to the various embodiments and their variants.

Thus, such a payment device 11 has in particular a location 14 for receiving the visual indicator support 10, on its upper face, and, in certain cases, an unlocking area 15 on its lower face.

According to the proposed technique, such a payment device 11 can be designed without taking into account the positioning of a visual indicator, of the contactless payment logo or usage warning type, and can thus be optimised in terms of compactness. Indeed, the arrangement of the components and in particular of the connectors, inside the payment device 11, can be optimised without worrying about the orientation of the visual indicator, this orientation being able to be obtained thanks to the visual indicator support 10 described above (according to the various embodiments of the proposed technique).

Finally, the proposed technique also allows to comply with the security constraints related to payment devices, by providing, according to the different embodiments:

- that the light guide 12 (provided in particular for the backlighting of the visual indicator) completely isolates the interior of the payment device 11 and thus prevents any access to the interior of the payment device 11, even when the visual indicator support 10 is not assembled, and
- that the visual indicator support 10 is irreversibly assembled to the payment device 11.

5.6 System

The proposed technique also relates, as already described above, to a system comprising a visual indicator support 10 assembled to a payment device 11 as described above according to the various embodiments and their variants.

The invention claimed is:

1. A visual indicator support configured to be assembled irreversibly on an outer face of a payment device and configured to assume an orientation position wherein, when assembled with said payment device, the visual indicator support is mobile in rotation, independently of said payment device, about an axis substantially perpendicular to said face of said payment device.

2. The visual indicator support according to claim 1, wherein the visual indicator support comprises at least one irreversible assembly element to cooperate with at least one corresponding irreversible receiving element on said payment device.

3. The visual indicator support according to claim 1, wherein said support is configured to assume a locking position, when assembled with said payment device, wherein said support is not mobile in rotation about said axis.

4. The visual indicator support according to claim 2, wherein the visual indicator support further comprises at least one locking element ensuring a locking position assumed by the support when assembled with said payment device and in which said support is not mobile in rotation about said axis.

5. The visual indicator support according to claim 1, wherein the support has a non-circular shape substantially identical to a shape of a receiving location provided on said outer face of said payment device and, in said orientation position, said support is positioned above said receiving location.

6. The visual indicator support according to claim 1, wherein said support is assembled to said payment device in a receiving location formed by a light guide provided on said outer face of said payment device and said support is mobile in rotation independently of said light guide, in said orientation position.

7. The visual indicator support according to claim 2, wherein said support has an outer face carrying a visual indicator and an inner face and wherein said support comprises a rod extending from said inner face of said support, said rod comprising at least two branches spaced by a clearance and each having at least one of said irreversible assembly elements.

8. The visual indicator support according to claim 7, wherein said branches each have at least one of locking element ensuring a locking position assumed by the support when assembled with said payment device and in which said support is not mobile in rotation about said axis.

9. The visual indicator support according to claim 2, wherein the support has a substantially circular shape and said support has an outer face carrying said visual indicator and an inner face and said support comprises at least a portion of a ring extending substantially perpendicularly from said inner face of said support, said at least one portion having at least one of said irreversible assembly elements.

10. The visual indicator support according to claim 1, wherein the support has on its outer face a gripping element.

11. A payment device comprising:

an outer face;

a receiving location on the outer face for a visual indicator support to be assembled irreversibly on the outer face of said payment device; and a receiver for receiving said visual indicator support and configured so that said visual indicator support assumes an orientation position wherein, when assembled with said payment device, the visual indicator support is mobile in rotation, independently of said payment device, about an axis substantially perpendicular to said outer face of said payment device.

12. The payment device according to claim 11, wherein the payment device comprises at least one irreversible receiving element to cooperate with at least one irreversible assembly element of said support.

13. The payment device according to claim 11, wherein the payment device comprises at least one locking receiving element to cooperate with at least one locking element of said support.

14. The payment device according to claim 11, wherein said receiving location is formed by a light guide preventing access to an interior of said payment device.

15. An apparatus comprising:

a payment device comprising:

an outer face;

a receiving location on the outer face for assembly of a visual indicator support; and a receiver for receiving said visual indicator support and configured so that said visual indicator support assumes an orientation position; and the visual indicator support, which comprises:

an assembly structure that cooperates with the receiver of the payment device to irreversibly assemble the support on the outer face of the payment device, wherein the visual indicator support is mobile in rotation, independently of said payment device, about an axis substantially perpendicular to said outer face of said payment device.

* * * * *